O. G. STRATTON,
Assignor to W. J. PEYTON, said PEYTON assignor to J. W. WHITE, J. C. WHITE and H. M LEWIS, Trustees
Bit Stock and Shank.
No. 9,582. Reissued Feb. 22, 1881.
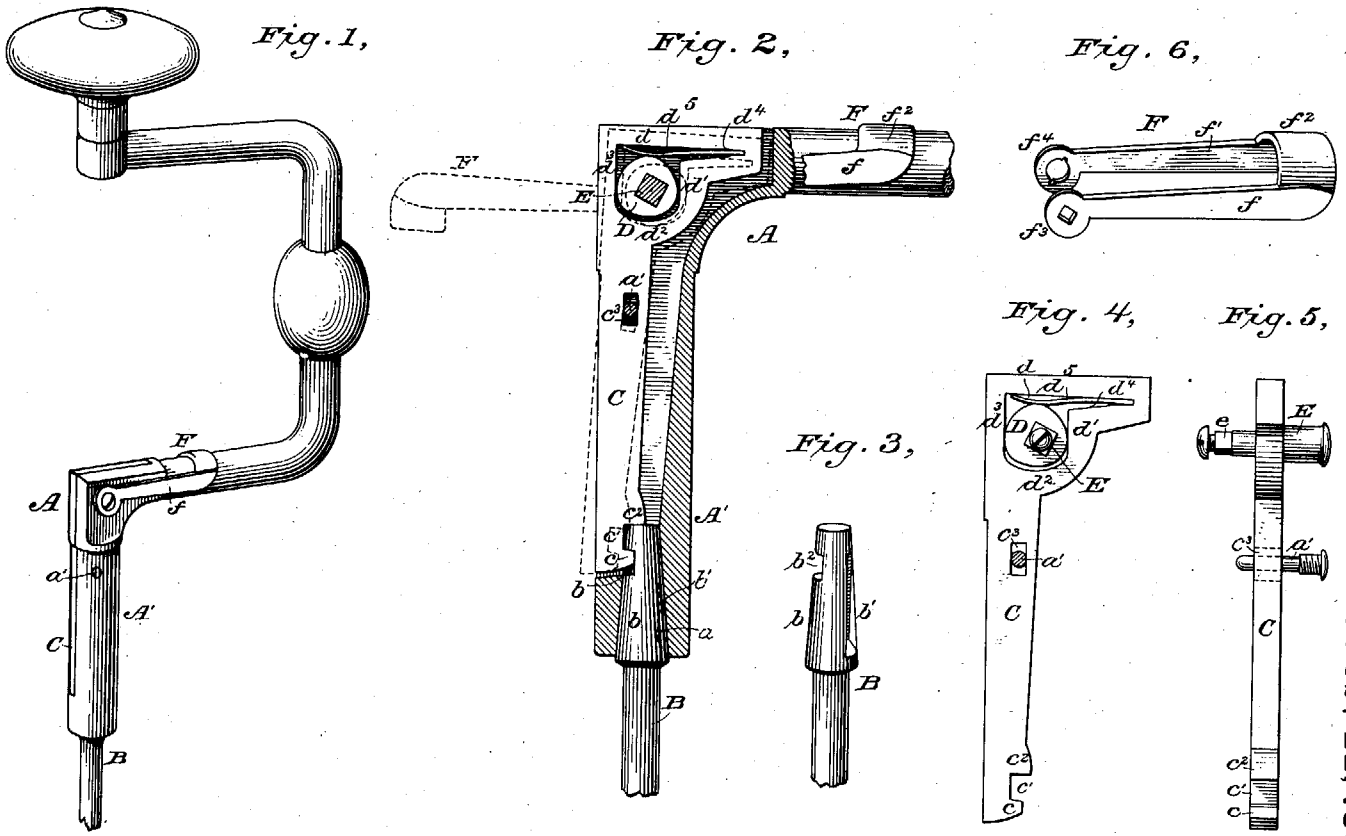
WITNESSES
Wm A. Skinkle.
Geo W Buck
INVENTOR
O. G. Stratton,
By his Attorneys
Baldwin, Hopkins & Peyton.

UNITED STATES PATENT OFFICE.

OSCAR G. STRATTON, OF GREENFIELD, MASSACHUSETTS, ASSIGNOR TO WILLIAM J. PEYTON, OF WASHINGTON, DISTRICT OF COLUMBIA; SAID PEYTON ASSIGNOR TO JAMES W. WHITE, JAMES CLARENCE WHITE, AND H. M. LEWIS, TRUSTEES, OF PHILADELPHIA, PENNSYLVANIA.

BIT STOCK AND SHANK.

SPECIFICATION forming part of Reissued Letters Patent No. 9,582, dated February 22, 1881.

Original No. 81,031, dated August 11, 1868. Application for reissue filed December 11, 1880.

*To all whom it may concern:*

Be it known that I, O. G. STRATTON, of Greenfield, in the county of Franklin and State of Massachusetts, have invented certain new and useful Improvements in Bit Stocks and Shanks; and I do hereby declare that the following is a full, clear, and exact description of the invention, reference being had to the accompanying drawings, which show the best way known to me of embodying my improvements at the date of filing my application for the original patent.

In said drawings, Figure 1 is a perspective view of a bit-stock or tool-holder having my improvements applied thereto, the shank of a bit or tool being shown as inserted in the holder. Fig. 2 is a longitudinal section through the portion of the stock or holder containing my improvements, the construction of the tool-shank and manner of securing it in the socket of the holder being shown. Fig. 3 is a view, in elevation, of the shank of the bit or tool. Figs. 4 and 5 are respectively a side and edge view of the tool-locking devices or mechanism carried by the stock or holder; and Fig. 6 is a view, in perspective, of a thumb-piece or lever, by the movement of which the tool-shank is secured in the stock or holder, or released therefrom by the disengagement of the tool-locking mechanism.

My invention consists in a conically-socketed bit stock or holder provided with a device, substantially as hereinafter described, for holding the shank of a bit or tool in its socket.

My invention further consists in a socketed bit stock or holder provided with a locking device, substantially as hereinafter described, which is movable lengthwise of said holder, and capable of engaging and drawing upon the tool-shank inserted in the socket when said locking device is acted upon by a cam to force it forward to release the tool.

My invention further consists in providing a bit stock or holder with a bit or tool receiving socket, conical in longitudinal section, and with a feather or projection in said socket to engage the shank of the bit or tool and prevent it from turning in its seat while permitting the tool to be readily disengaged when its removal from the socket is desired.

My invention further consists in constructing the shank of the tool with a conical portion to fit the conical tool-receiving socket, and with a longitudinal recess to receive a feather or projection in said socket.

My invention further consists in constructing the shank of the tool with a conical portion to fit the conical tool-receiving socket, and with a longitudinal recess and a cross-groove or notch, the said recess to receive a projection in the socket to prevent the tool from turning in its seat, and the said groove to receive the locking device which secures the shank in the socket from disengagement.

My invention further consists in the combination of a stock or holder having a conical tool-receiving socket, a bit or tool having a conical-shank portion to fit said socket, and a locking device for the bit or tool, the action of which is not only to hold the shank securely in the socket, but also to exert a slight draft to draw it into the socket in the operation of locking, and to produce a slight thrust when it is released, so as to start it from the socket.

In the accompanying drawings I have shown a carpenter's bit stock or brace, A, as the stock or tool holder, the upper portion of which is provided with a handle or winch of the usual form. The straight tool-holding portion A′ of said stock is socketed for the reception of the shank of the operating bit or tool, and said socket is conical in longitudinal section or tapers inward conically from its front end. A ridge or feather, *a*, projects into the socket of the holder at one side, and constitutes the tool-driving surface thereof.

The bit or tool shank B has a conical portion, *b*, to fit the conical socket of the holder. Said shank is also provided with a longitudinal slot, passage, or recess, *b′*, for the passage of the driving-surface *a* of the holder, which surface positively drives the tool-shank and prevents it from turning in the socket. Said shank is also provided with a cross-notch, groove, or locking-surface, $b^2$, and in order to lock the shank in the socket against endwise movement, separation, or disengagement while in operation I provide the holder with a tool-locking device or mechanism to engage said notch $b^2$. Said tool-holding device or mechanism consists of a lever or latch, C, pivoted in a longitudinal recess in the tool-holding portion A′ of the stock. The front or lower end of said lever is provided with a shoulder or hook, C, in advance of a slot, $c'$, and said shoulder engages with the notch or groove $b^2$ of the tool-shank, to lock said shank in the socket against endwise movement or withdrawal. Back of or above the slot $c'$ the latch is provided with a shoulder, $c^2$, which projects into the tool-socket to a greater extent than the locking-shoulder or hook $c$, and acts as a gage or stop to arrest the entrance of the shank into the socket and to stop it at the proper point, so that the hook or shoulder $c$ will always enter the locking-notch $b^2$ of said shank. The locking or hooked end of the lever or latch C is capable of a slight lateral motion to engage it with or disengage it from the locking-notch of the tool-shank, and said lever or latch is also capable of endwise movement to a certain extent relatively to the holder and its socket.

By giving the locking latch or lever its endwise movement, (or a movement lengthwise of the holder,) as well as the lateral movement which its hooked end possesses, the said hooked end of the latch, when brought into engagement with the locking-groove of the tool-shank, will not only lock said shank in the socket, but it will exert a drawing action thereon, and will draw or pull the conical portion of the shank tightly and snugly into its corresponding seat in the socket, and will hold it there, so that it cannot move either endwise or laterally until the latch is moved forward and its hooked end caused to ride or move laterally or sidewise out of engagement with the shank. This feature is very important, as all loose movement or lateral vibration of the tool in the socket is prevented.

By forming the shoulder $c^2$ upon the latch or lever I am also enabled when the latch is moved forward to release the shank, to thrust or crowd said shank outward and loosen it in its conical seat, owing to the abutment or contact of said shoulder with the butt-end of the shank, whereby I obviate a serious objection to conical sockets, inasmuch as heretofore tools have been liable to stick in such sockets and were often dislodged therefrom with difficulty.

The advantages of a conical socket to receive a conical tool-shank, as described by me, over the usual pyramidal or prismatic socket and corresponding bit or tool shank are many. For instance, the conical shank may be drawn firmly into the conical socket and be accurately centered, which is impossible with a pyramidal or a round unshouldered tool-shank. The conical sockets and shanks are, moreover, more cheaply made and capable of a nicer fit relatively to each other, so as to prevent lateral vibration of the tool in the socket during its rotation, it being almost impossible to prevent lateral vibration of the tool in the socket with pyramidal or cylindrical forms of tool-shanks. Again, by the use of the conical socket and shank, wear of either may be readily taken up or compensated for.

In order to operate the lever or latch C, so as to move its locking end laterally and also to move it endwise for the purposes mentioned, I have shown a cam arrangement, which I will now describe.

An elongated slot, $c^3$, is formed in the lever or latch C, through which passes a pin, $a'$, which acts as a pivot, about which the latch is rocked, and upon which it is moved endwise when actuated by the cam D. An opening, $d$ $d'$ $d^2$ $d^3$, is formed in the upper part of said latch above its pivot, in which said cam D is fitted to turn. A slot, $d^4$, is also formed in the latch as a seat for a friction-spring, $d^5$, which bears against the cam D and holds it in any position to which it is adjusted. Said cam is somewhat irregular in shape, having bearing-points, which work against the sides $d'$ $d^2$ $d^3$ of the opening and against the spring $d^5$, and cause the lever or latch C to move about the pivot $a'$ as a center of motion. Said cam is provided with a rectangular opening to receive the correspondingly-shaped middle portion of a rocking-shaft, E, so that the cam will be turned when the shaft is rocked. Said shaft is rocked or turned by means of a forked thumb-piece or finger-lever, F, consisting of two arms, $f$ $f'$, connected by a strap, $f^2$, the thumb-piece being so formed as to embrace the bit-stock or tool-holder and be entirely out of the way when said holder is in use. A portion, $e$, of the rocking cam-shaft E is rectangular and fits the rectangular opening $f^3$ in the arm $f$ of the thumb piece or lever F, while the opening $f^4$ in the arm $f'$ of said thumb-piece receives the opposite cylindrical end of said shaft. By this construction it will be obvious that the thumb-piece or finger-lever operates the cam-shaft by means of the arm having the square opening fitting the similar portion $e$ of said shaft, and turns said shaft in the same manner as a winch.

The operation of the tool-holder and locking mechanism is as follows: The thumb piece or lever F being brought into the position shown by the dotted lines in Fig. 2, the shank of the bit or other tool is thrust into the conical socket of the holder in such manner that the passage or channel $b'$ in the shank receives the driving-surface or feather $a$ in the socket. The thumb-piece is then rocked or brought to the position shown by the full lines in Figs. 1 and 2, and the shank is securely fastened in the socket by the hook or shoulder $c$ of the locking-latch, which enters the cross-groove or locking-surface $b^2$ of the shank of the tool. The relative conformation of the cam D and its seat or opening in the tool-locking latch or lever C is such that the action of the latch upon the shank of the tool is twofold when the cam is turned by the thumb-piece, both in the operation of fastening the tool in the socket and also in releasing it therefrom—that is to say, in the operation of fastening the tool in the socket the locking end of the latch or lever will be depressed and its shoulder or hook $c$ forced laterally into the tool-socket and into engagement with the locking-notch $b^2$ in the shank of the tool, owing to the action of the cam upon the side wall, $d^3$, of its opening; and as said cam is still further revolved to bring the thumb-piece closely against the holder, the latch, by the action of the cam against the spring $d^5$, will be drawn upward lengthwise of the holder or away from the socket in the direction of its length, and thereby the conical portion of the shank of the tool will be drawn forcibly and tightly into its corresponding seat in the socket of the stock or holder.

Owing to the action of the cam D upon the spring $d^5$ to cause the pull or draw upon the tool-shank, it will be seen that small differences in the size of tool-shanks may be accommodated, while wear of the tool or socket is taken up or compensated for.

In the reverse operation of releasing the shank of the tool the first action of the cam D upon the locking latch or lever, when the thumb-piece is raised or rocked from the holder, will be to move the lever or latch slightly but forcibly forward or toward the outer end of the socket, (caused by the action of the cam upon the wall or side $d^2$ of its opening,) whereby the shoulder $c^2$ of the latch will be pressed against the end of the tool and the latter will be started from or loosened in the socket. As the thumb-piece is turned still farther, to the position shown by the dotted lines in Fig. 2, the lower or front end of the latch, owing to the action of the cam upon the side $d'$ of its opening, will rise or move laterally out of its recess in the holder sufficiently to withdraw or disengage its locking end from the locking-notch in the shank of the tool, and the said tool can then be readily removed or separated from the stock or holder.

I am aware that bit-stocks have heretofore been constructed to a limited extent with an eccentric or cam for directly or indirectly fastening the bit into the socket; and I do not claim, broadly, the use of a cam for holding a tool-shank in place.

I also disclaim, broadly considered, "the application to a bit stock or brace of a device for holding the shank of the bit in its socket, which device is operated by a cam and convenient thumb-piece," in which application my invention was stated to consist in the original patent. Such application I have found to be not original with me.

I also disclaim, broadly considered, a tool-locking device of a tool-holder which has the capacity not only of exerting a drawing action upon a tool in the operation of locking, but also of exerting a thrusting action upon the tool to loosen it in the socket for removal.

I claim as my invention—

1. The combination, substantially as hereinbefore set forth, of the stock or holder having a conical socket or seat, and a feather or projection to engage the tool-shank inserted in said socket, the tool-shank having a conical portion to fit said socket and a recess to receive said feather or projection, and a locking-latch carried by said holder to secure said shank in said socket as against endwise movement during the operation of the tool, while permitting ready removal of the tool from the holder when desired.

2. The combination, substantially as hereinbefore set forth, of a socketed stock or holder, a tool-locking latch movable lengthwise of said holder and capable of engaging and drawing or pulling upon the tool-shank inserted in the socket thereof, and a rocking cam to force said locking device forward to disengage it from said tool-shank.

3. The combination, substantially as hereinbefore set forth, of a socketed stock or holder, a tool-locking latch movable lengthwise of said holder and capable of engaging and drawing or pulling upon the tool-shank inserted in the socket thereof, a rocking cam to force said locking device forward to disengage it from the tool-shank, and a thumb piece or lever to actuate the cam.

4. The bit stock or holder constructed, substantially as hereinbefore set forth, with a conical bit or tool receiving socket, and with a feather or projection to engage the shank of the bit or tool to prevent it from turning in its seat, while permitting it to be readily removed from the socket when desired.

5. The combination, substantially as hereinbefore set forth, of the stock or holder having a conical socket and a feather or projection to engage the tool-shank inserted in said socket, the tool-shank having a conical portion to fit said socket, and a recess to receive said feather or projection, and the locking-latch movable lengthwise of said tool-holder to engage the tool-shank and draw its conical portion into the corresponding seat in the holder-socket, whereby not only is the tool locked in the socket as against endwise movement, but it is also prevented from vibration or loose lateral motion therein.

6. A tool-shank constructed, substantially as hereinbefore set forth, with a conical portion to fit a conical tool-receiving socket, and with a longitudinal recess to receive a feather or projection in said socket.

7. A tool-shank having the following characteristics: first, a conical portion to fit a correspondingly-shaped socket in its holder; second, a longitudinal passage or recess for the passage of a tool-driving projection in said holder; and, third, a cross notch or groove to engage locking mechanism which locks the shank from endwise movement in the holder.

8. The combination, substantially as hereinbefore set forth, of a stock or holder having a conical tool-receiving socket or seat, and a tool-driving projection with a locking-latch movable lengthwise of said holder, and provided with a locking end and loosening shoulder, whereby the conical-shanked tool inserted in said stock is drawn tightly into its seat and securely locked by the movement of the latch in one direction and loosened in said socket for removal when moved in the opposite direction.

Witness my hand this 8th day of November, A. D. 1880.

OSCAR G. STRATTON.

Witnesses:

BAXTER B. NOYES,

CHAS. F. EDDY.